UNITED STATES PATENT OFFICE.

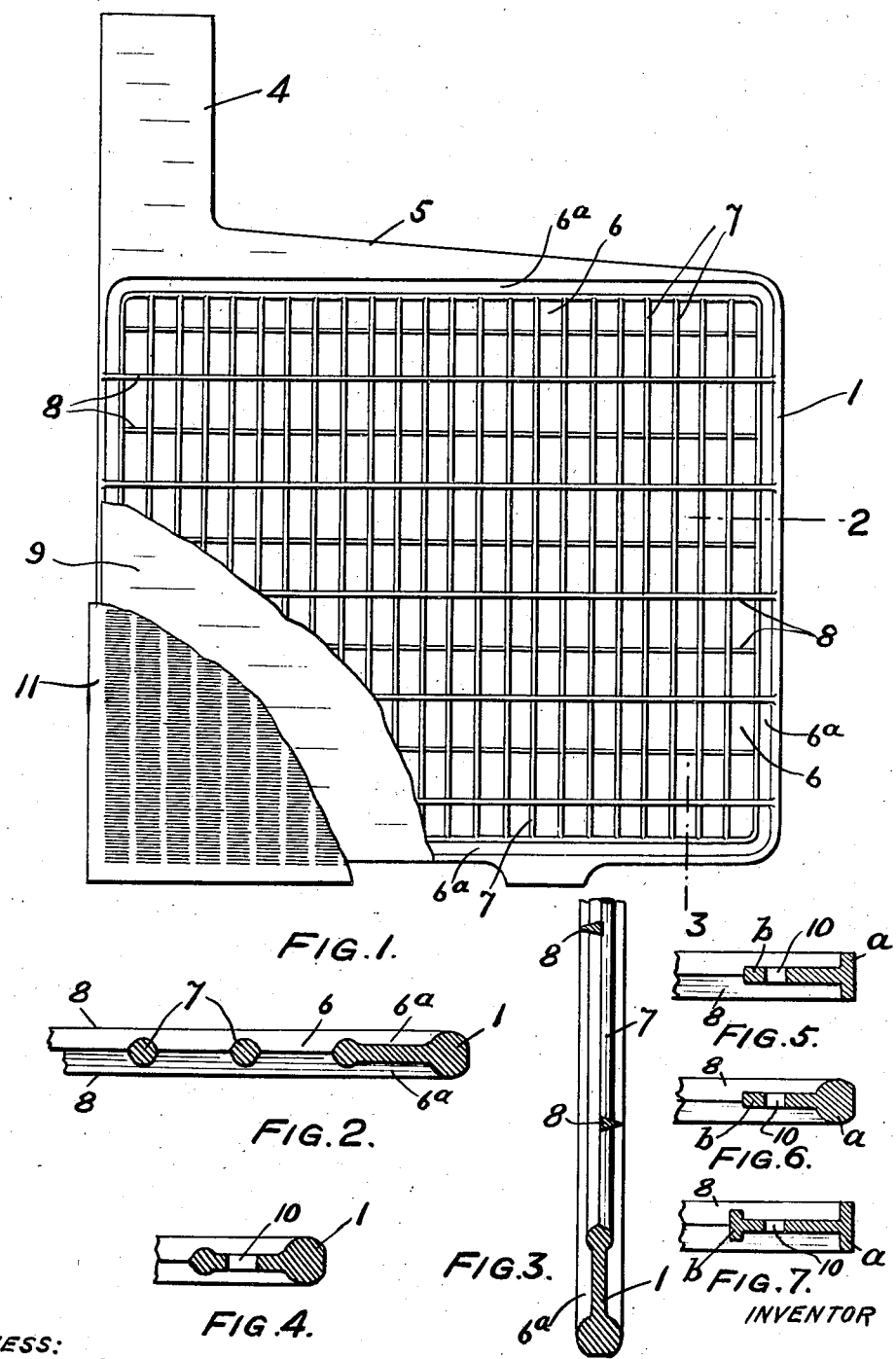

BRUCE FORD, OF PHILADELPHIA, PENNSYLVANIA.

STORAGE-BATTERY PLATE.

1,376,929.           Specification of Letters Patent.       Patented May 3, 1921.

Application filed January 23, 1920. Serial No. 353,484.

*To all whom it may concern:*

Be it known that I, BRUCE FORD, a citizen of the United States, residing at Philadelphia, in the county of Philadelphia and State of Pennsylvania, have invented certain new and useful Improvements in Storage-Battery Plates, of which the following is a specification.

The principal objects of the present invention are to increase the durability of the grid or frame structure of storage battery plates, especially the positive pole plates and thus add to the reliability of the battery throughout an increased life, and to increase not only the capacity but also the voltage at a high rate of discharge, or in other words, to provide a battery which will deliver increased energy for a given number of plates of a given size, or a given energy for a decreased number or size of plates, together with increased reliability and durability.

Fundamentally the invention is based upon the embedding in the active material of a large portion of the grid metal comprising the outside or marginal frame of the plate. The extreme marginal outside portion of the frame of a plate is almost necessarily of the full thickness of the plate, but as contemplated by this invention a large portion of the marginal frame is made thinner than the thickness of the plate and is arranged substantially on the center line between the plate faces; it will thus be apparent that for a given quantity of metal employed for the outside frame of the grid, a plate of a given overall length and width will have a greater surface of active material than if the entire metal of the outside frame were of the full thickness of the plate, because that portion of the outside frame which is made thinner than the plate is covered by active material. This covering of active material tends, particularly in a positive pole plate, to protect the metal so covered against corrosion and disintegration to which this metal is subject when exposed to the direct electrolytic action at the plate surface.

In the following description reference will be made to the accompanying drawings forming part hereof and in which—

Figure 1, is an elevational view with parts broken away of a plate embodying features of the invention.

Fig. 2, is a section drawn to an enlarged scale and taken on the line 2, of Fig. 1.

Fig. 3, is a similar view taken on the line 3, of Fig. 1, and

Figs. 4, 5, 6, and 7, are views similar to Fig. 2, and illustrating modifications.

In the drawings 1, is the outside or marginal rectangular frame of a grid and it has a marginal portion or bead $a$, of substantially the thickness of the plate, and a web section $b$, of less thickness than the bead and extending inward which in the finished plate is buried in the active material, or material to become active 9, which extends to the marginal portion or bead $a$.

In Figs. 4 to 7, the web is shown as perforated at 10, and when this is done, additional keying is provided for the active material.

In cross section a frame embodying features of the invention may assume various forms, for example, Fig. 4, shows it of deck-beam form, and Figs. 5, 6 and 7, show some of other forms. However, the deck-beam form is possessed of special advantages.

This rectangular frame is shown as provided at its top with a lug 4, having a tapering extension 5, along the top of the frame. This tapering extension, when present, provides horizontal conductivity without sacrifice of active surface. The frame 1, contains a grillage and is provided with cavities $6^a$, arranged around the frame, and with cavities 6, which when filled with active material provide for the latter an uninterrupted surface entirely across the frame and web sections of the sides thereof. The grillage, as shown, consists of vertical rods 7, disposed in and substantially confined to the plane of the web section $b$, of the frame, or in other words, to the median plane of the frame, and the grillage also consists of horizontal tie-bars 8, extending across the web section to the bead section $a$, of the frame, and these bars 8, extend to the opposite faces of the frame. The paste or active material or material to become active 9, may extend as a thin coat over the outer surfaces of the tie-bars 8, or stop flush with those surfaces. In any event the web portions $b$ of the frame 1, are buried in the active material and only a small portion of the marginal bead portion $a$, may come to the surface of the active material or material to become active.

From the foregoing description it will be evident to those skilled in the art that in proportion to the total plate area the active surface is large since, by covering the web portion $b$, it extends practically to the outer marginal edge or bead $a$, of the frame 1, but without sacrifice of strength of the frame. The vertical rods 7, being buried in the active material do not diminish the active surface, and they may be sufficiently numerous to facilitate electric conductivity to the top of the plate by providing an ample path in the direction in which the current tends to flow.

11, is a retainer which is shown as consisting of a slotted rubber sheet, because such a retainer and separator gives good results with the described plate, but the invention is not limited to the use of such a separator or retainer or to the details of construction or arrangement shown and described or in any way other than the prior art and the appended claims may require. For example, the described frame with marginal bead and inward web possesses advantages of its own which can be availed of without the special grillage described, which is made the subject-matter of my application, Serial No. 353,485, but the described frame and described grillage possess advantage in combination and are so claimed in that application.

I claim:

1. A storage battery plate having a grid consisting of a grillage surrounded by a rectangular marginal frame of deck-beam cross section whereby cavity space is provided at the web section of the frame, substantially as described.

2. A grid for storage battery plate consisting of a grillage surrounded by rectangular marginal frame having a web section whereby cavity space is provided at the web section of the frame, substantially as described.

3. A grid for storage battery plate consisting of a grillage surrounded by a rectangular marginal frame of web section the web portion of which is provided with perforations, substantially as described.

4. A storage battery plate having a frame provided with a marginal portion or bead of substantially the thickness of the plate and with a web section of less thickness than the bead and buried in the active material, or material to become active, which extends to the bead, substantially as described.

5. A storage battery plate having a frame provided with a marginal portion or bead of substantially the thickness of the plate and with a perforated web section of less thickness than the bead and buried in the active material, or material to become active, which extends through the perforations and to the bead, substantially as described.

BRUCE FORD.